United States Patent
Haghighat et al.

(10) Patent No.: US 11,838,784 B2
(45) Date of Patent: Dec. 5, 2023

(54) METHODS FOR PANEL ACTIVATION/DEACTIVATION FOR UPLINK MIMO TRANSMISSION

(71) Applicant: INTERDIGITAL PATENT HOLDINGS, INC., Wilmington, DE (US)

(72) Inventors: Afshin Haghighat, Ile-Bizard (CA); Ghyslain Pelletier, Montreal (CA); Mouna Hajir, Montreal (CA); J. Patrick Tooher, Montreal (CA); Nazli Khan Beigi, Longueuil (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 30 days.

(21) Appl. No.: 17/634,311

(22) PCT Filed: Aug. 13, 2020

(86) PCT No.: PCT/US2020/046207
§ 371 (c)(1),
(2) Date: Feb. 10, 2022

(87) PCT Pub. No.: WO2021/030605
PCT Pub. Date: Feb. 18, 2021

(65) Prior Publication Data
US 2022/0295322 A1   Sep. 15, 2022

Related U.S. Application Data

(60) Provisional application No. 62/932,269, filed on Nov. 7, 2019, provisional application No. 62/910,137, filed on (Continued)

(51) Int. Cl.
*H04W 24/10* (2009.01)
*H04B 7/0413* (2017.01)

(52) U.S. Cl.
CPC ......... *H04W 24/10* (2013.01); *H04B 7/0413* (2013.01)

(58) Field of Classification Search
CPC .......................... H04W 24/10; H04B 7/0413
See application file for complete search history.

(56) References Cited

U.S. PATENT DOCUMENTS

| 2019/0132851 | A1  | 5/2019  | Davydov et al. |
| 2022/0217746 | A1* | 7/2022  | Kang ................... H04B 7/0691 |

FOREIGN PATENT DOCUMENTS

| WO | 2018/031807 | 2/2018 |
| WO | 2018/232294 | 12/2018 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Rahel Guarino
(74) *Attorney, Agent, or Firm* — Volpe Koenig

(57) ABSTRACT

Systems, methods, and devices for panel activation and/or deactivation for uplink multi-in multi-out (MIMO) transmission are disclosed. A device, such as a wireless transmit receive unit (WTRU) may have one or more antennal panels. Each panel may have an identifier (ID). Based on reported feedback that includes measurement information, one or more panels may be activated or deactivated. In some embodiments, a gNB may determine whether to activate or deactivate a panel. In other embodiments, a WTRU may determine to activate or deactivate a panel.

20 Claims, 16 Drawing Sheets

Related U.S. Application Data on Oct. 3, 2019, provisional application No. 62/886,182, filed on Aug. 13, 2019.

(56) References Cited

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "Discussion on CBSR Solutions," 3GPP TSG RAN WG1 #98b, R1-1910414, Chongqing, Chin (Oct. 14-18, 2019).
Interdigital Inc., "Views on Panel Activation and Deactivation," 3GPP TSG RAN WG1 #98, R1-1908233, Prague, CZ (Aug. 26-30, 2019).
MCC Support, "Final Report of 3GPP TSG RAN WG1 #98 v2.0.0 (Prague, Czech Rep, Aug. 26-30, 2019)," 3GPP TSG RAN WG1 Meeting #98bis, R1-1911429 Chongqing, China (Oct. 14-18, 2019).
Third Generation Partnership Project, "Technical Specification Group Radio Access Network; NR; Physical layer procedures for data (Release 15)," 3GPP TS 38.214 V15.6.0 (Jun. 2019).
Third Generation Partnership Project, "Technical Specification Group Radio Access Network; NR; Physical layer procedures for data (Release 15)," 3GPP TS 38.214 V15.10.0 (Jun. 2020).
Third Generation Partnership Project, "Technical Specification Group Radio Access Network; NR; Physical layer procedures for data (Release 16)," 3GPP TS 38.214 V16.2.0 (Jun. 2020).
Third Generation Partnership Project, "Technical Specification Group Radio Access Network; NR; Multiplexing and channel coding (Release 15)," 3GPP TS 38.212 V15.6.0 (Jun. 2019).
Third Generation Partnership Project, "Technical Specification Group Radio Access Network; NR; Multiplexing and channel coding (Release 15)," 3GPP TS 38.212 V15.9.0 (Jun. 2020).
Third Generation Partnership Project, "Technical Specification Group Radio Access Network; NR; Multiplexing and channel coding (Release 16)," 3GPP TS 38.212 V16.2.0 (Jun. 2020).
Third Generation Partnership Project, "Technical Specification Group Radio Access Network; NR; Physical layer procedures for control (Release 15)," 3GPP TS 38.213 V15.6.0 (Jun. 2019).
Third Generation Partnership Project, "Technical Specification Group Radio Access Network; NR; Physical layer procedures for control (Release 15)," 3GPP TS 38.213 V15.10.0 (Jun. 2020).
Third Generation Partnership Project, "Technical Specification Group Radio Access Network; NR; Physical layer procedures for control (Release 16)," 3GPP TS 38.213 V16.2.0 (Jun. 2020).
Third Generation Partnership Project, "Technical Specification Group Radio Access Network; NR; User Equipment (UE) radio access capabilities (Release 15)," 3GPP TS 38.306 V15.6.0 (Jun. 2019).
Third Generation Partnership Project, "Technical Specification Group Radio Access Network; NR; User Equipment (UE) radio access capabilities (Release 15)," 3GPP TS 38.306 V15.10.0 (Jul. 2020).
Third Generation Partnership Project, "Technical Specification Group Radio Access Network; NR; User Equipment (UE) radio access capabilities (Release 16)," 3GPP TS 38.306 V16.1.0 (Jul. 2020).
Third Generation Partnership Project, "Technical Specification Group Radio Access Network; NR; Medium Access Control (MAC) protocol specification (Release 15)," 3GPP TS 38.321 V15.6.0 (Jun. 2019).
Third Generation Partnership Project, "Technical Specification Group Radio Access Network; NR; Medium Access Control (MAC) protocol specification (Release 15)," 3GPP TS 38.321 V15.9.0 (Jul. 2020).
Third Generation Partnership Project, "Technical Specification Group Radio Access Network; NR; Medium Access Control (MAC) protocol specification (Release 16)," 3GPP TS 38.321 V16.1.0 (Jul. 2020).
Third Generation Partnership Project, "Technical Specification Group Radio Access Network; NR; Radio Resource Control (RRC) protocol specification (Release 15)," 3GPP TS 38.331 V15.6.0 (Jun. 2019).
Third Generation Partnership Project, Technical Specification Group Radio Access Network; NR; Radio Resource Control (RRC) protocol specification (Release 15), 3GPP TS 38.331 V15.10.0 (Jul. 2020).
Third Generation Partnership Project, "Technical Specification Group Radio Access Network; NR; Radio Resource Control (RRC) protocol specification (Release 16)," 3GPP TS 38.331 V16.1.0 (Jul. 2020).

\* cited by examiner

METHODS FOR PANEL ACTIVATION/DEACTIVATION FOR UPLINK MIMO TRANSMISSION

CROSS-REFERENCE TO RELATED APPLICATIONS

This application is the U.S. National Stage, under 35 U.S.C. § 371, of International Application No. PCT/US2020/046207 filed Aug. 13, 2020, which claims the benefit of U.S. Provisional Application No. 62/886,182, filed Aug. 13, 2019, U.S. Provisional Application No. 62/910,137, filed Oct. 3, 2019, and U.S. Provisional Application No. 62/932,269, filed Nov. 7, 2019, the contents of which are incorporated herein by reference.

BACKGROUND

In wireless communication systems there may be devices that have one or more antenna panels that may be used to communicate wirelessly to other wireless devices. As technology advances, the number of panels and the management of these panels need to be addressed.

SUMMARY

Systems, methods, and devices for panel activation and/or deactivation for uplink multi-in multi-out (MIMO) transmission are disclosed. A device, such as a wireless transmit receive unit (WTRU) may have one or more antennal panels. Each panel may have an identifier (ID). Based on reported feedback that includes measurement information, one or more panels may be activated or deactivated. In some embodiments, a gNodeB (gNB) may determine whether to activate or deactivate a panel. In other embodiments, a WTRU may determine to activate or deactivate a panel.

In some embodiments, a WTRU may request a panel selection, receive an indication for measurements for each panel of a first set of panels, report feedback for each panel of the first set of panels, and receive an indication of a selection of one or more panels. In other embodiments, a WTRU receives a signal to report to a gNB, transmits, to the gNB, a panel configuration of the WTRU and an indication of a switch of a hot panel, wherein the hot panel is an activated panel that is used for transmission, and switches to a new hot panel based on the indication. In yet other embodiments, a WTRU receives a signal to report to a gNB, transmits, to the gNB, a panel configuration of the WTRU and an indication of a panel modification, wherein the panel configuration is based on one or more factors, and modifies the panel configuration according to the indication.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
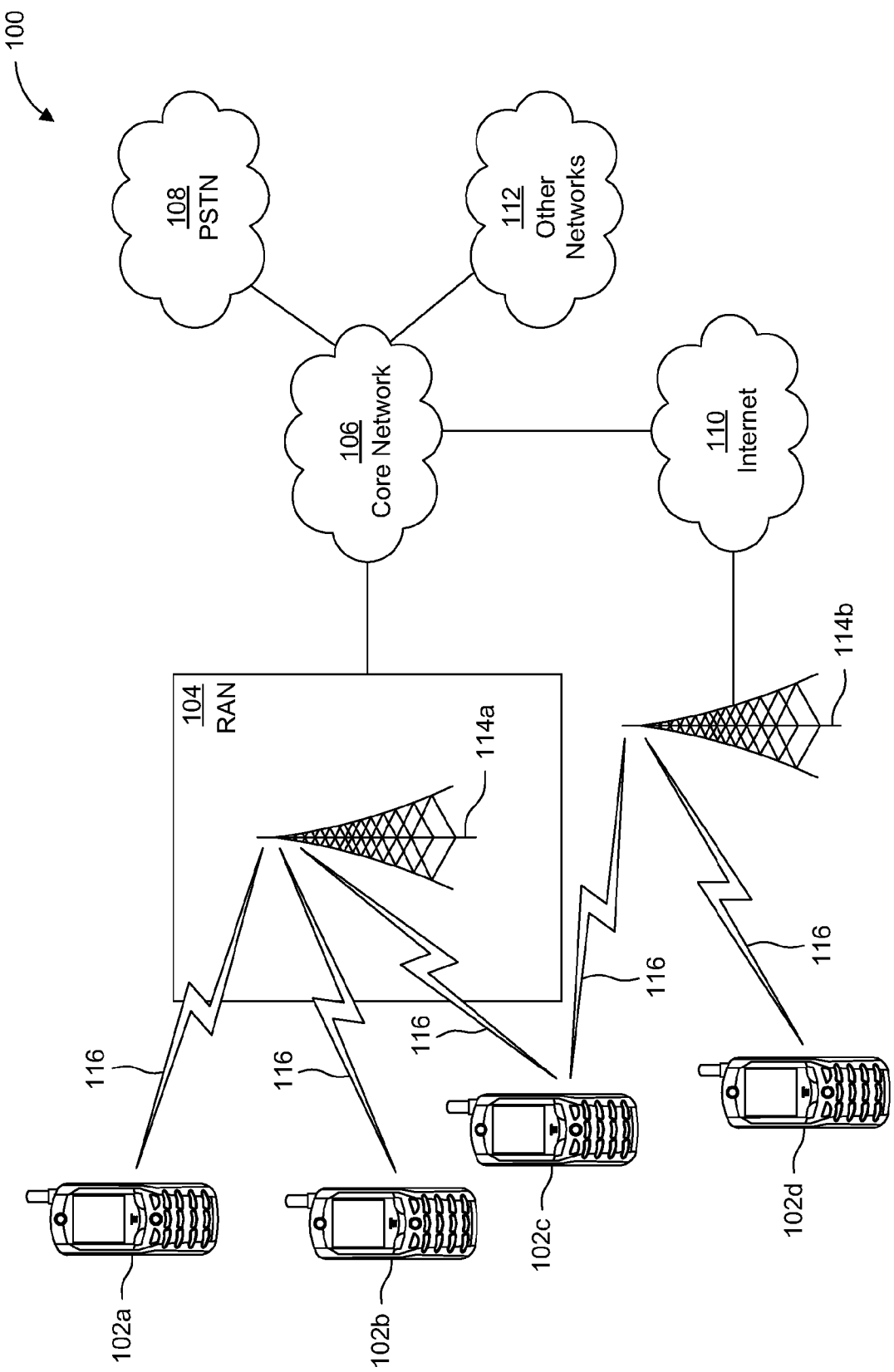
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
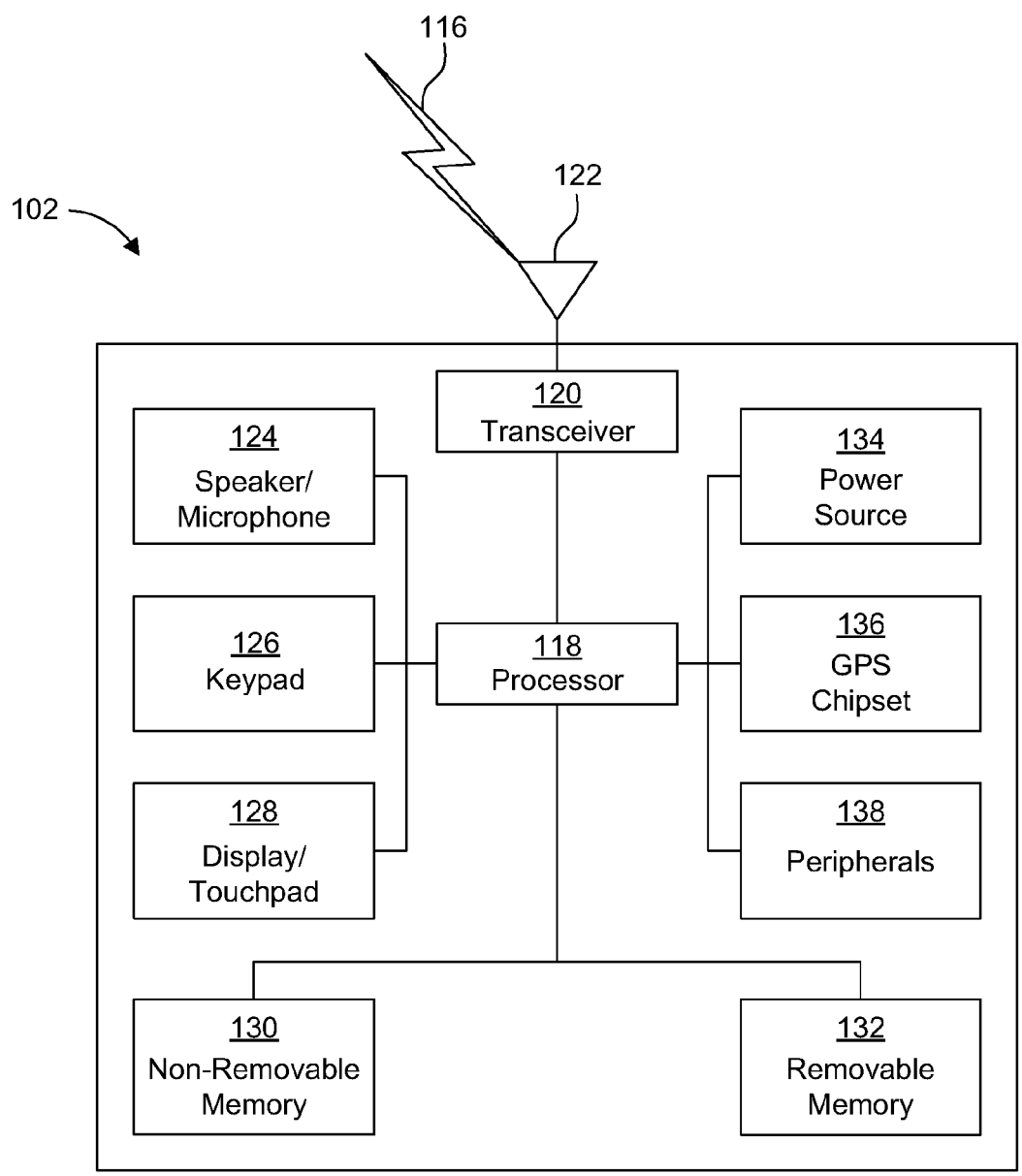
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
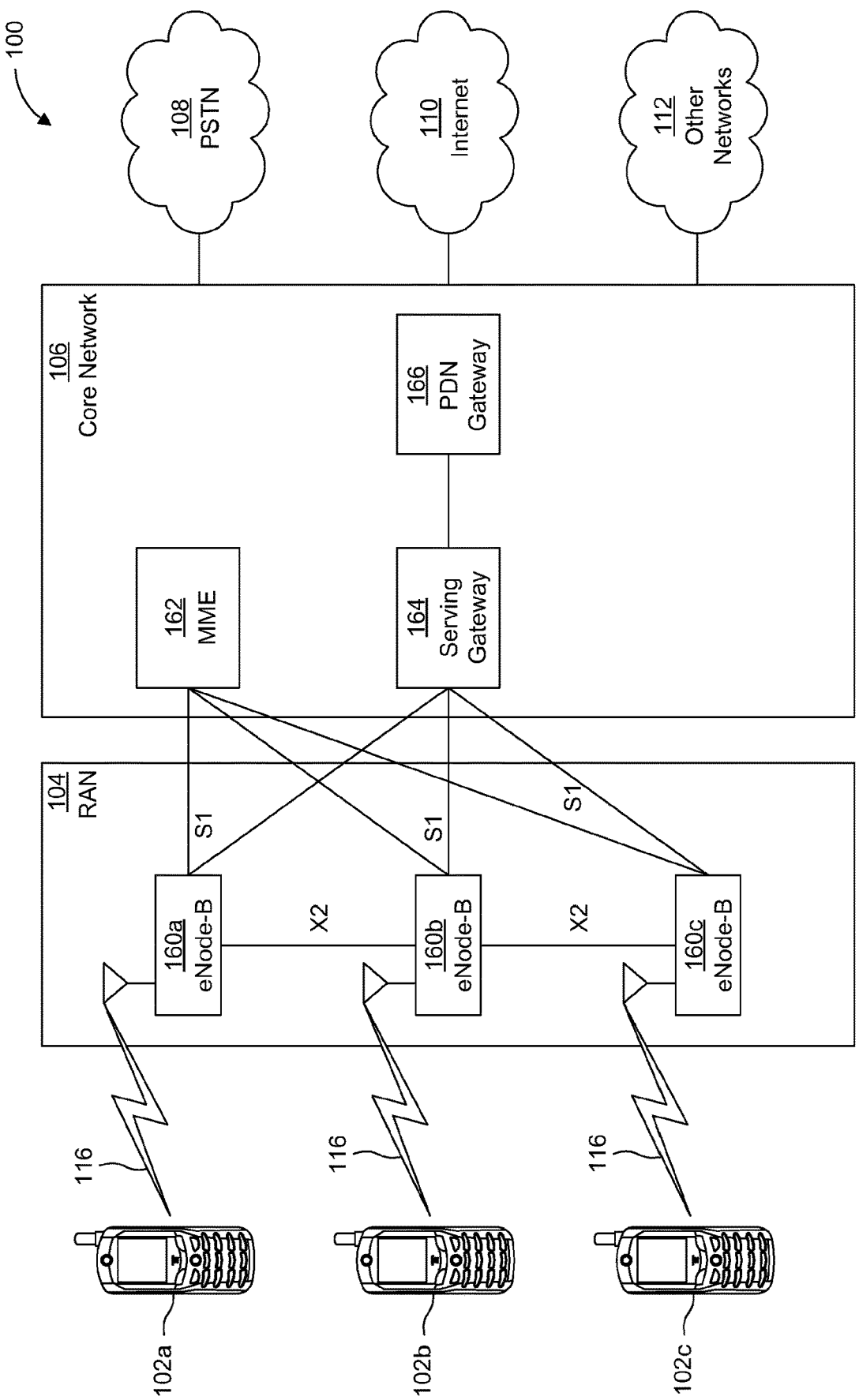
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
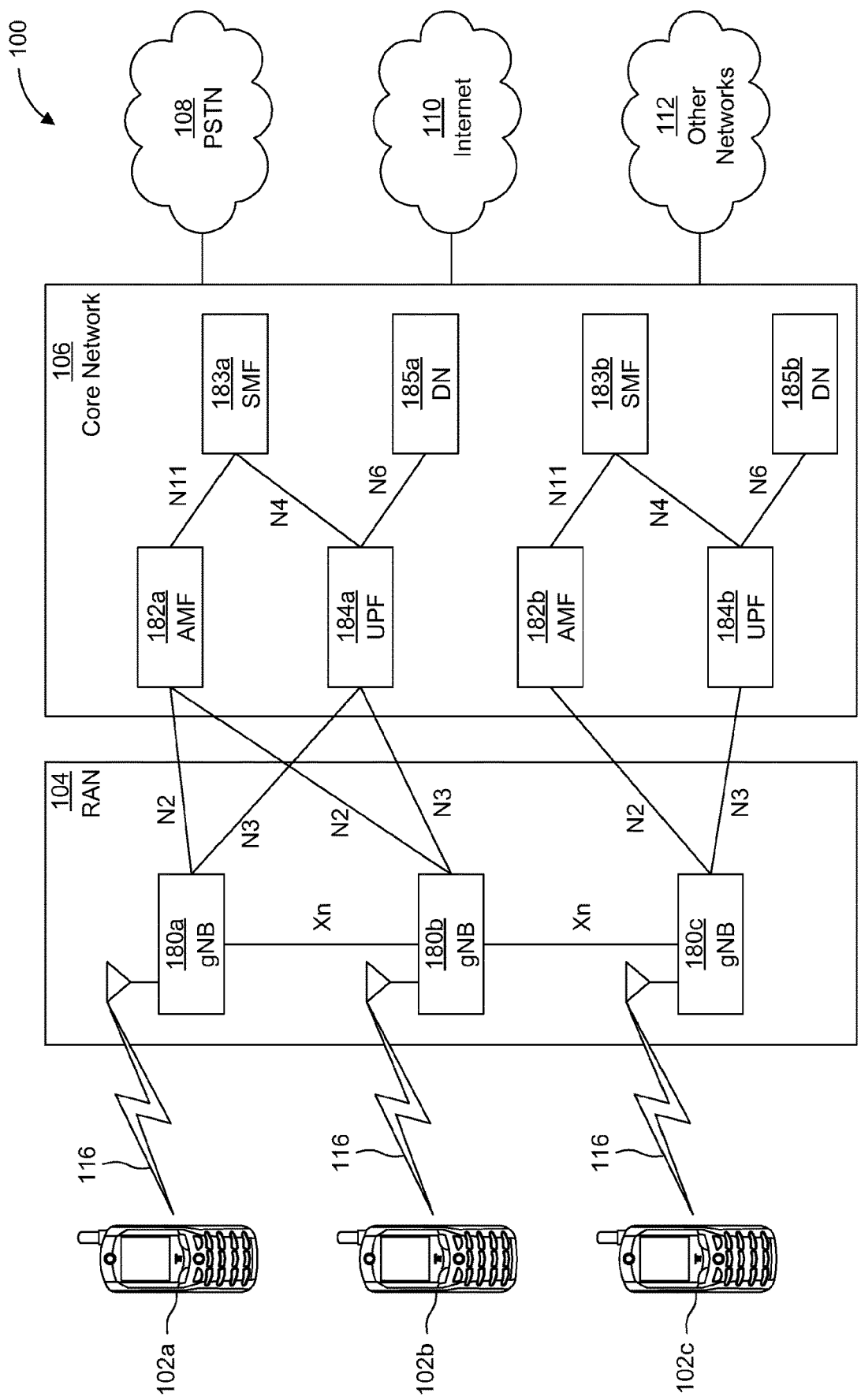
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
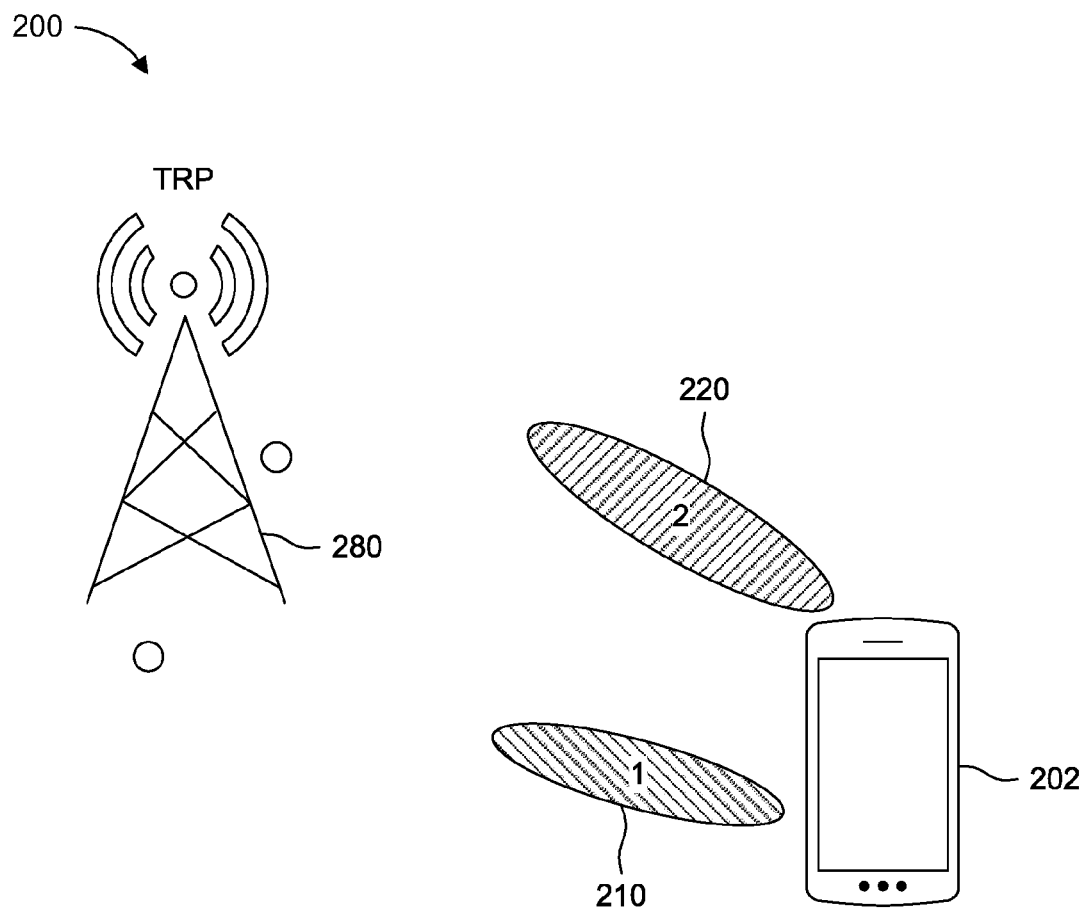
FIG. 2 is a diagram illustrating an example WTRU multi-panel configuration, according to an embodiment.

As shown in FIG. 2, a WTRU 202 may be built with a plurality of antenna panels 210, 220, where each panel 210, 220 has multiple antenna elements. Each panel 210, 220 may be placed on a different side of a WTRU 202 to allow for better reception and transmission by increasing diversity and avoiding potential blockage. While enhanced transmission through employing multiple panels is beneficial, it may not always be necessary to have all panels activated.

The main benefits of panel activation/deactivation (PAD) include fast selection of the best beam and/or panel for uplink transmission and power saving.

Moreover, PAD may address issues related to Maximum Permissible Emission (MPE). Power Management Maximum Power Reduction (P-MPR) may address MPE requirements, but in a multi-panel WTRU, when the power assigned to a panel is impacted by P-MPR, it may become a less appropriate panel for uplink transmission. As such, fast panel switching through PAD may offer better transmission through a panel that is not impacted by P-MPR.

In multi-panel operation in NR, there may be three categories of multi-panel WTRU (MPWTRU): (1) MPWTRU-Assumption1, where multiple panels are implemented on a WTRU and only one panel may be activated at a time, with a panel switching/activation delay of X ms; (2) MPWTRU-Assumption2, where multiple panels are implemented on a WTRU, multiple panels may be activated at a time and one or more panels may be used for transmission; and/or (3) MPWTRU-Assumption3, where multiple panels are implemented on a WTRU, multiple panels may be activated at a time but only one panel may be used for transmission.

The WTRU may be provided, by RRC configuration element schedulingRequestIDForBFR, a configuration for PUCCH transmission with a link recovery request (LRR). The WTRU may transmit in a first PUSCH at least one MAC control element (CE) providing at least one index for at least one corresponding SCell with radio link quality worse than a threshold (e.g., Qout,LR). Higher layers may provide the WTRU provided an index q_"new" for a periodic channel state information reference signal (CSI-RS) configuration or for a signal/physical broadcast channel (SS/PBCH) block, if any. On a condition that K symbols, after a last symbol of a PDCCH reception with a DCI format, scheduling a PUSCH transmission with the same HARQ process number as the transmission of the first PUSCH, and having a toggled NDI field value, the WTRU may assume that the same antenna port quasi-collocation parameters for PDCCH receptions on an SCell as the ones associated with a corresponding index q_"new", if any. Generally, the WTRU may trigger the LRR to indicate beam failure to the network when it determines that all CSI-RS measurements are below a configured threshold over a configurable period of time. The WTRU may then transmit a MAC CE that includes at least one Cell ID and CSI-RS not part of the set used to evaluate whether or not to trigger LRR.

Figure 3B:
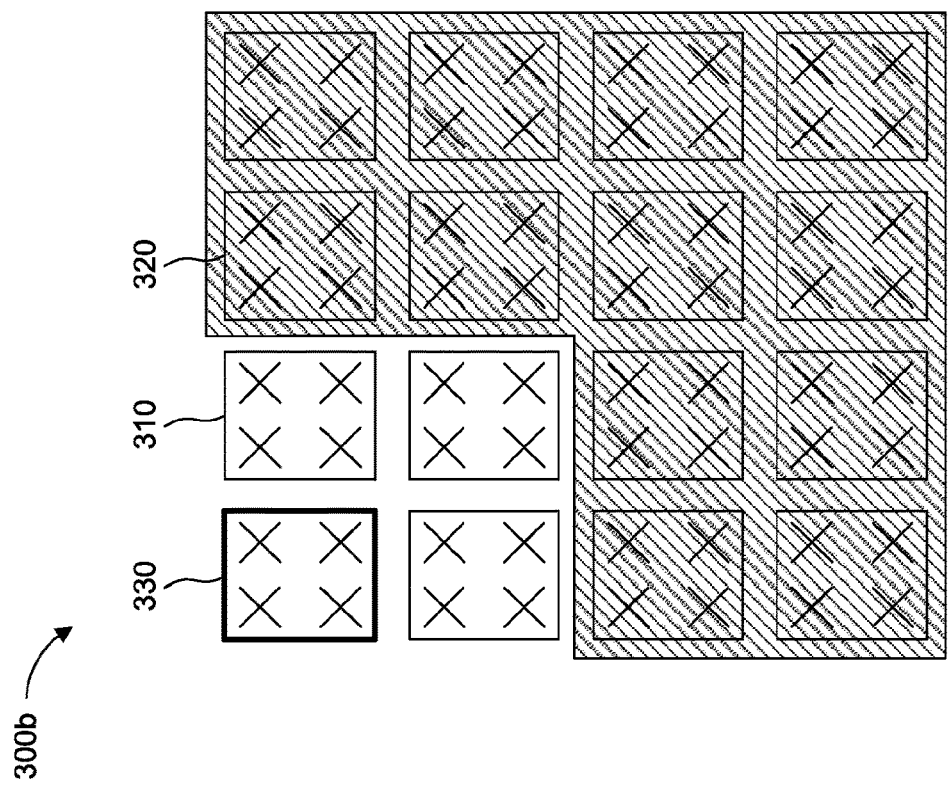
FIG. 3B is a diagram illustrating an example multi-panel WTRU where four panels are activated, according to an embodiment.
Figure 3A:
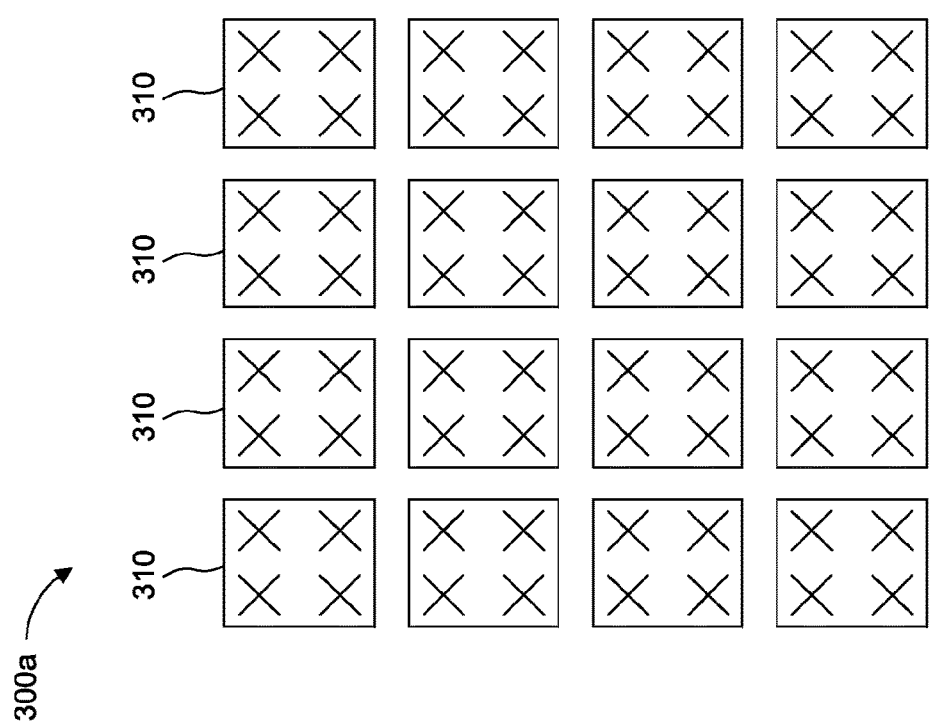
FIG. 3A is a diagram illustrating an example multi-panel WTRU where all panels are activated, according to an embodiment.

FIG. 3A is a diagram of an example MPWTRU architecture 300a where all panels are activated panels 310 and may be used for transmission and reception.

FIG. 3B is a diagram of an example MPWTRU architecture 300b where only four panels are activated panels 310 and the remaining panels are deactivated panels 320. Only one panel of the activated panels 310 transmits and may be referred to as the hot panel 330.

In one or more embodiments discussed herein, one or more of the following may be addressed: overall operation of PAD and how a WTRU evaluates and manages PAD in a WTRU and/or gNB-driven operation; enhancement(s) for CSI-RS framework for PAD and solutions with and without using a Panel ID; synchronization of a PAD between a WTRU and a gNB (e.g., explicit or implicit); and/or power consumption reduction based on WTRU activity.

Generally, as shown in FIG. 3B, in operation of PAD three different groups of panels may be considered: activated panels 310, deactivated panels 320, and hot panels 330. Activated panels may be the panels are turned on and may be used for reception. Deactivated panels 320 may be the panels that are turned off. Hot panels 330 may be the activated panels that may be used for transmission.

A WTRU PAD operation may be implemented in different ways. In some embodiments, PAD operation may have an impact on gNB transmission/reception. More specifically, two approaches may be considered for panel selection: gNB-driven and WTRU-driven.

Figure 4:
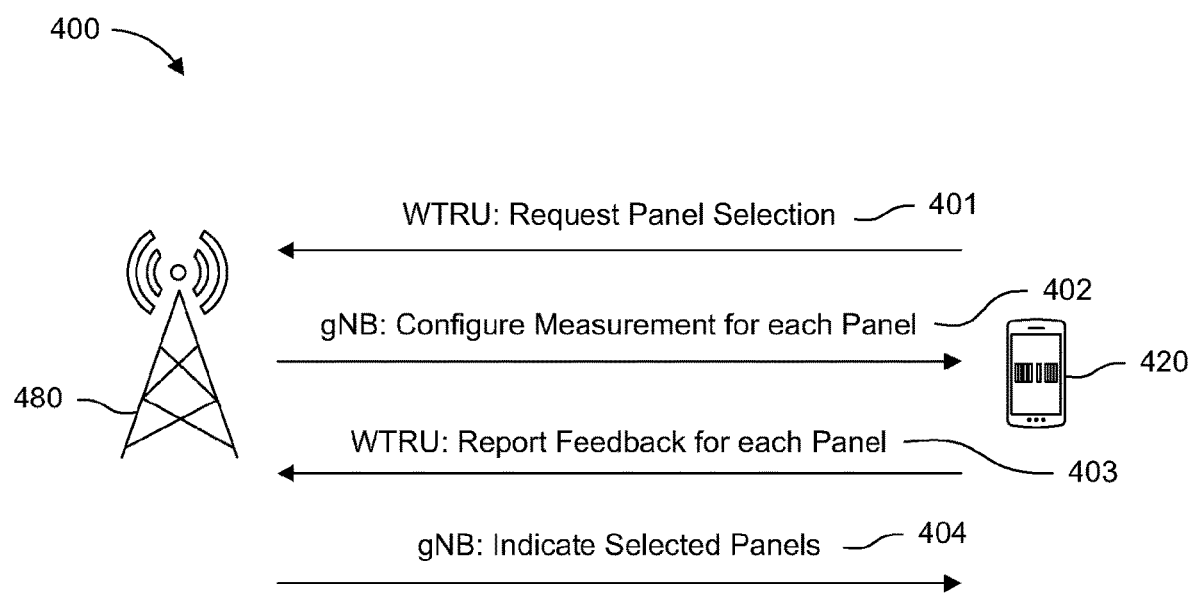
FIG. 4 is a diagram illustrating an example gNB-driven panel selection procedure, according to an embodiment.

FIG. 4 shows an example gNB-driven panel selection procedure 400, according to an embodiment. In the procedure 400, the gNB may manage the activation and deactivation of one or more WTRU panels. At 401, a WTRU 420 may request a panel selection. In some embodiments, the gNB may wake up the WTRU panels periodically or aperiodically for beam or CSI measurement to select an optimal subset of panels. Additionally or alternatively, a WTRU may request a panel selection process based on an event and/or one or more measurements. The event may include, but is not limited to, an antenna blockage, a human body proximity, or a handset rotation. The one or more measurements may include, but are not limited to RSRP, SINR, CQI, and rank.

At 402, the gNB 480 configures a measurement for each panel of a first set of panels. In some embodiments, the measurements may be preconfigured, such that a WTRU may be triggered by downlink control information (DCI) or a MAC element to initiate measurement and reporting. The measurements and reporting per panel may be sequential in multiple reports, in one instant, or a combination thereof.

At 403, the WTRU 420 may report feedback for each panel of the first set of panels.

At 404, the gNB 480 may indicate one or more selected panels. In some embodiments, the gNB may indicate the panel selection through a SRS resource indicator (SRI), a CRI, or a panel ID. Additionally or alternatively, the gNB may indicate the panel selection by an index linked to timing of a WTRU report.

A WTRU may be configured with CSI-RS resources. In some embodiments, one or more of the CSI-RS resources may be for deactivated panels. Such CSI-RS resources may be considered dormant while a panel is deactivated.

Upon a configurable event occurring, the WTRU may begin monitoring the CSI-RS resources by temporarily activating one or more deactivated panels for measurement. The event triggering the WTRU monitoring of deactivated panels may include at least one of: measurements (e.g. CQI, RSRP, and the like) on one or more activated panels falling below a threshold value; one or more indications received from the gNB to begin performing measurements on the CSI-RS of a set of deactivated panels (e.g., such an indication may provide the list of deactivated panels to perform measurements on, or may be applicable to all dormant CSI-RS resources); time, where the WTRU may routinely or periodically perform measurements on otherwise dormant CSI-RS resources; and/or, HARQ ACK/NACK status, where the WTRU may begin monitoring dormant CSI-RS based on the HARQ ACK status (e.g., upon multiple NACKs, the WTRU may determine that the currently activated panels are not providing a functional performance).

The WTRU may report to the gNB, one or more selected panels from the panels that were temporarily activated for measurement (e.g., based on measurements performed on otherwise dormant CSI-RS resources). In some embodiments, the WTRU may send a request to the gNB to transmit otherwise dormant CSI-RS resources. Such a request may use the same triggers as listed above.

Upon the selection of a new set of panels, the WTRU may feedback the one or more selected panels. In some embodiments, the feedback transmission may be performed on a hot panel from the first set of activated panels. The selection of one or more panels may also trigger the WTRU to transmit a SRS on one or more of the selected panels that are currently deactivated. The SRS may use previously dormant SRS resources. This may enable the network to identify a new hot panel from the one or more selected panels.

Figure 5:
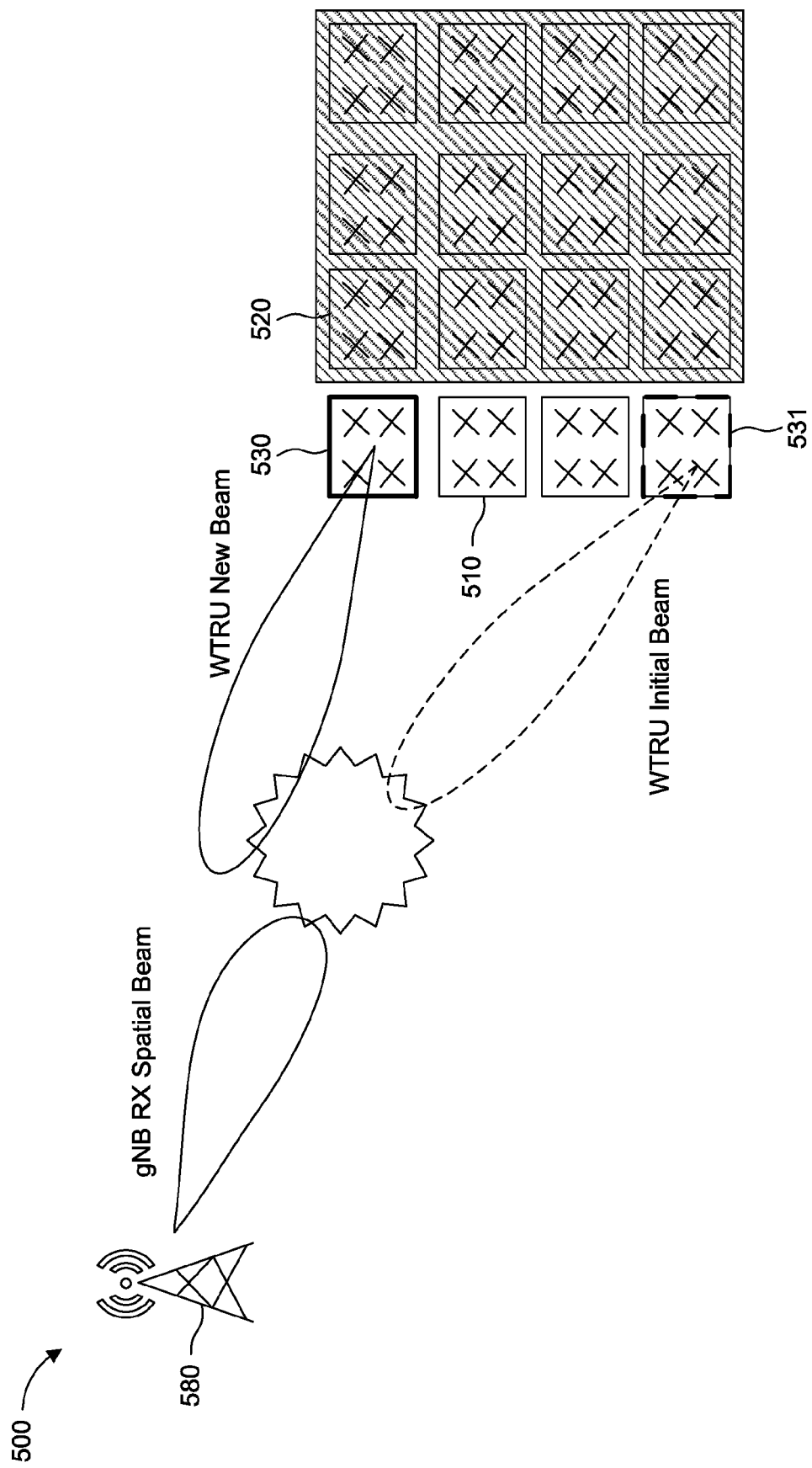
FIG. 5 is a diagram illustrating a WTRU-driven panel activation/deactivation (PAD) operation, according to an embodiment.

FIG. 5 is a diagram illustrating a WTRU-driven PAD procedure 505, where the WTRU autonomously selects the optimal panel for transmission, according to an embodiment.

In some embodiments, there may be an explicit methodology, such as where a WTRU may receive signaling that may instruct the WTRU to report to a gNB. WTRU-driven panel switching may be a purely event-driven (i.e., WTRU rotation, MPE) or condition-driven (i.e., power saving) mechanism where the WTRU selects a new panel and/or beam entirely on its own.

In some embodiments using explicit methodology, a WTRU may quickly and independently decide to turn a panel on or off for transmission to save power and/or select the best beam and/or panel for transmission. This may address the flexible spatial relation where a WTRU can update its TX beam by itself without gNB updating the spatial relations.

The WTRU may send its current panel configuration as a report to the gNB. In some embodiments, the WTRU indicates to the gNB, a panel switch prior to the actual switch. For example, the WTRU may signal to the gNB that it is going to activate/deactivate a WTRU panel.

In some embodiments, there may be an SRS-based report to the gNB, such as where SRS resources indicate a panel configuration of the WTRU. The WTRU may be configured with a SRS resource set, where each resource may be assigned to specific subset of panels. Upon the selection of a new hot panel 530, the WTRU may transmit an SRS to the network.

The WTRU may be configured with SRS resources for each of its activated panels 510. In some embodiments, the WTRU may transmit the SRS on the hot panel. When the WTRU autonomously switches to a new hot panel 530, it may begin transmitting the SRS on the resources of the new hot panel 530. To reduce reception complexity at the network, there may be limitations for when the WTRU may effectively activate the dormant SRS resource. For example, in some embodiments, there may be a subset of all SRS occasions for a panel that can be used by the WTRU to indicate a switch of hot panel.

In some embodiments, the WTRU may reuse the same SRS resource for any panel when it wishes to switch hot panels. The WTRU may provide an indication when an SRS transmission is for a new panel compared to a previous SRS transmission. In some embodiments, the indication may be explicit and transmitted in addition to the SRS. In other embodiments, the indication may be implicit and may impact the selection of one the parameters of the SRS. An implicit indication may comprise the selection of sequence for the SRS which may depend on whether the panel transmitting the current SRS is the same as that which was used for a prior SRS transmission.

A SRS resource may be any aspect of the WTRU's SRS configuration and/or any aspect of the SRS transmission. In some embodiments, a SRS resource may comprise a set of resources for the SRS transmission, as described above. Additionally or alternatively, the WTRU may be configured with a plurality of sequences for the SRS transmission, where a specific (e.g., first or second) sequence indicates a specific panel configuration (e.g., first and second, respectively).

In some embodiments, a WTRU may perform PAD based on radio link monitoring (RLM), where the WTRU is configured with multiple RLM processes for each panel. The monitoring occasion and periodicity may be different based on whether the panel is activated or deactivated. The WTRU may declare RLF and initiate re-establishment only after all of the T310 timers associated with each configured panel expire.

In other embodiments, the WTRU may only monitor the RLM resources in the activated panel. Upon detecting physical layer problems for the SpCell (i.e. upon receiving N310 consecutive out of synchronization (OOS) indications), the WTRU may start monitoring deactivated panels while one or more of the T310 timers associated with each configured panel are active.

In some embodiments, if the activated panel is OOS while another configured deactivated panel is in synchronization (IS), the WTRU recovers the link towards another panel instead of declaring RLF and re-establishment.

In some embodiments, the WTRU may further transmit the cause of panel switching and the identity of the new activated panel to the network.

In some embodiments, a WTRU may perform PAD based on beam failure detection/recovery. The WTRU may be configured to monitor reference signals for beam failure detection. It may be configured with one or more RSs for this purpose or may use the activated TCI-State for PDCCH for beam failure detection by counting the number of consecutive failure instances. In some embodiments, the WTRU may be configured with multiple beam failure detection processes for the multiple configured panels. For example, the WTRU may be configured with an association between RSs and panels, or measure the same RSs from different panel. In the event of a beam failure detection in one panel, the WTRU may recover a beam in another activated panel. In some embodiments, the WTRU may be configured with a candidate beam list for beam failure recovery on each configured panel.

To indicate the new activated panel to the network, the WTRU may further be configured with an association between the preamble and/or physical random access channel (PRACH) resources and panel IDs for beam failure recovery request and to indicate the preferred panel to the network.

In some embodiments, there may be a CSI-RS framework for PAD, as discussed herein. In NR, time and frequency resources that can be used by the WTRU to report CSI may be controlled by the gNB. CSI may be comprised of Channel Quality Indicator (CQI), precoding matrix indicator (PMI), CSI-RS resource indicator (CRI), SS/PBCH Block Resource indicator (SSBRI), layer indicator (LI), rank indicator (RI), and/or L1-RSRP.

In embodiments, the WTRU may be configured to modify its panel configuration according to one or more factors. Modifying panel configuration may comprise activating and/or deactivating panels.

In some embodiments, a factor may be resource allocation, where the WTRU may modify its panel configuration as a function of the identity of currently active bandwidth part (BWP). For example, the WTRU may be configured to apply a first panel configuration when it operates in a first BWP, and apply a second configuration when it operates in a second BWP. For a WTRU configured with multiple concurrently active BWPs (e.g., by carrier aggregation), the BWP that controls the panel configuration may correspond to that of the PCell for a given MAC instance. For a WTRU configured with multiple cell groups and/or MAC instances (e.g., by dual connectivity), the BWP that controls the panel configuration may correspond to that of the PCell of the MCG if the WTRU is configured to operate with a single panel. This may be useful for the NW to implicitly control the WTRU power consumption related to the WTRU's panel configuration as a function of the currently active BWP.

In some embodiments, a factor may be one or more time-based determinations, where the WTRU may modify its panel configuration as a function of a timer-based operation. For example, the WTRU may apply a first panel configuration when the Timing Alignment Timer (TAT) is running, and it may apply a second panel configuration otherwise. For example, the WTRU may be configured with a timer (e.g., panelDefaultConfig-Timer). The WTRU may start the timer when it applies a first panel configuration. The WTRU may restart the timer upon specific events, and/or the WTRU may apply a second panel configuration, such as when the timer expires and/or when the timer is not running. Events that restart the timer may include the reception of specific scheduling information (e.g., specific DCI format, indication, transmission parameters), reception of MAC CE that restarts the timer, and/or a change in activation state (e.g., activation) of one or more cells for a given MAC instance associated with the concerned panel. The WTRU may stop the timer, or the WTRU may consider it as expired, if the WTRU detects radio link problems for at least one cell associated with the concerned panel, and/or if it determines that measurements meet a specific threshold (e.g., when the WTRU is in worsening radio conditions and/or closer to the cell edge). The WTRU may stop the timer, or the WTRU may consider it as expired, if the WTRU determines that the Timing Alignment Timer (TAT) expires. This may be useful for the NW to implicitly control the WTRU power consumption related to the WTRU's panel configuration as a function of the WTRU's scheduling activity.

In some embodiments, a factor may be a power saving algorithm, where the WTRU may modify its panel configuration as a function of the discontinuous reception (DRX) state and/or activity. For example, the WTRU may apply a first panel configuration when it determines that it is in DRX Active Time, and it may apply a second panel configuration otherwise. For example, in some embodiments, the WTRU may apply a first panel configuration when it determines that DRX operates according to the short DRX cycle, and it may apply a second panel configuration otherwise. In other embodiments, the WTRU may apply a first panel configuration when it determines that it is in the On-Duration period of DRX, and it may apply a second panel configuration otherwise. This may be useful for the NW to implicitly control the WTRU power consumption related to the WTRU's panel configuration as a function of the WTRU's DRX mechanism.

In some embodiments, a factor may be a power saving signaling, where the WTRU may modify its panel configuration as a function of received signaling such as the Wake Up Signal (WUS). For example, the WTRU may receive such a WUS and may modify its operation on one or more control channels, such as increasing the amount of blind decoding attempts. In another example, the WTRU may receive such a WUS and may modify the current DRX state, or an aspect thereof. The WTRU may apply a first panel configuration when it determines that it has received a WUS signal while operating using a second panel configuration. This may be useful for the NW to implicitly control the WTRU power consumption related to the WTRU's panel configuration as a function of the WTRU's power control mechanism.

In some embodiments, a factor may be a PRACH resource selection, where the WTRU may modify its panel configuration as a function of starting the RACH procedure and/or initiating the transmission of a preamble. For example, the WTRU may apply a first panel configuration when it initiates a transmission of a preamble for the purpose of obtaining uplink timing alignment while it previously applied a second panel configuration. The WTRU may apply a first panel configuration when it receives a DCI on PDCCH that indicates that a random access procedure should be initiated (e.g., PDCCH order) while it applied a second panel configuration. In some embodiments, the WTRU may select a first resource to indicate a first panel configuration, and a second resource to indicate a second panel configuration. In other embodiments, the WTRU may use a default panel configuration. This may be used to implicitly control the WTRU power consumption related to the WTRU's panel configuration as a function of periods of inactivity interrupted by a WTRU-initiated (e.g., UL data arrival) or by NW-initiated (e.g., DL data arrival) data transmissions, respectively.

In some embodiments, a factor may be beam management and failure monitoring, where the WTRU may modify its panel configuration as a function of CSI-RS measurements. For example, the WTRU may modify its panel configuration if it determines that all CSI-RS measurements applicable to the current panel configuration are below a configured threshold, possibly over a configurable period of time. For example, the WTRU may modify its panel configuration if it determines that it should initiate the LRR procedure to indicate beam failure to the network.

Panel configuration may include activation/deactivation of one or more panels and/or applying a different configuration (e.g., a default panel configuration).

Figure 6:
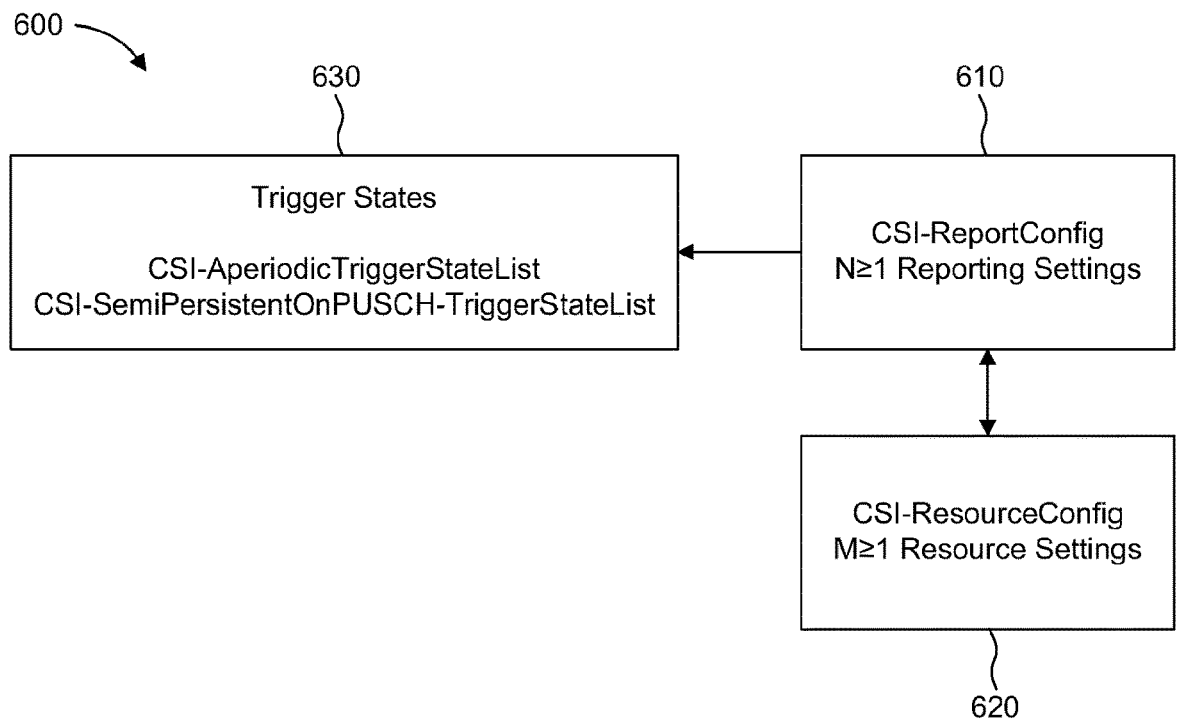
FIG. 6 is a diagram illustrating an example new radio (NR) channel state information reference signal (CSI-RS) framework, according to an embodiment.

FIG. 6 is a diagram illustrating an example of the CSI-RS framework in NR 600. The framework 600 may operate based on the following three configuration objects: CSI-ReportConfig 610, CSI-ResourceConfig 620 and one or more lists of trigger states 630. The CSI-ReportConfig 610 may include N1 Reporting Settings where details related to the measurement reporting mechanism are captured. The CSI-ResourceConfig 620 may include M1 different Resource Settings that can be coupled with at least one of N Report settings.

In some embodiments, the one or more lists of trigger states may include: CSI-AperiodicTriggerStateList and CSI-SemiPersistentOnPUSCH-TriggerStateList. Each list may comprise at least one trigger state associated to a defined CSI-ReportConfigs setting.

For a WTRU with PAD capability where panels may be dynamically activated and deactivated, CSI-RS measurements may be configured for each set of panels independently. In some embodiments, to avoid reconfiguration following dynamic activation/deactivation of panels, panel IDs may be used to link CSI-RS configuration to a specific set of panels.

Figure 7:
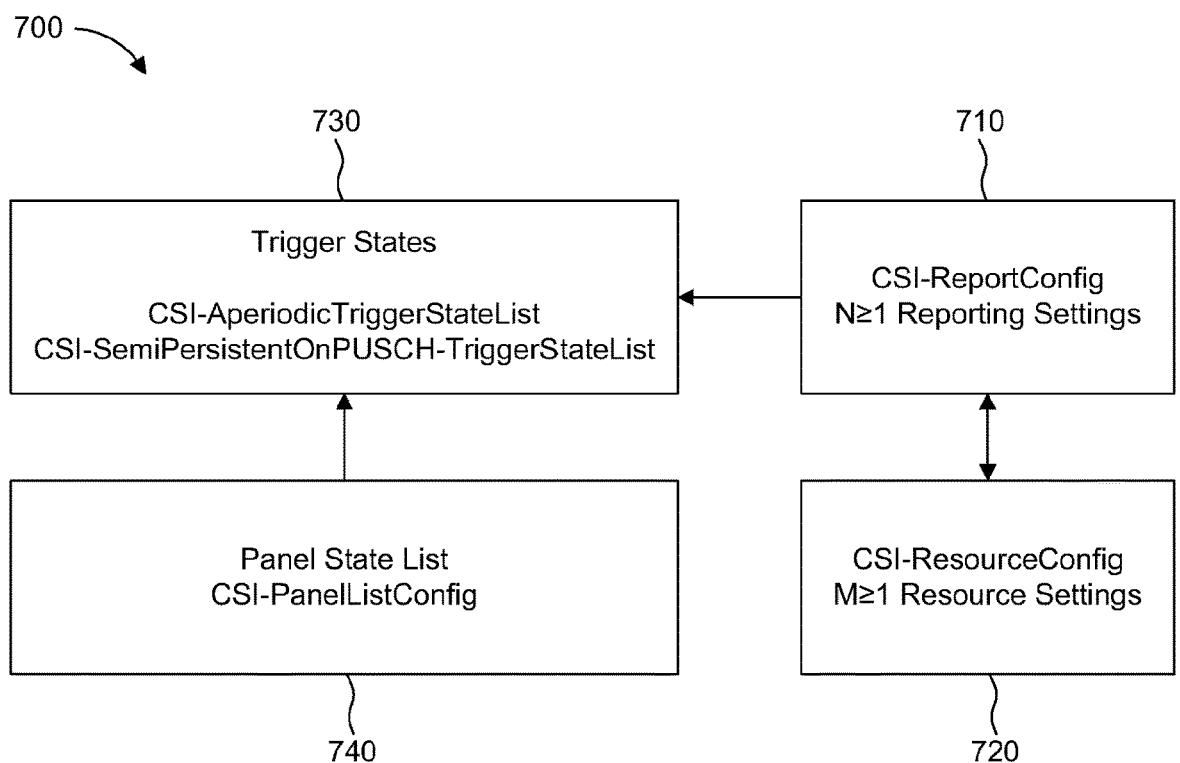
FIG. 7 is a diagram illustrating an example a CSI-RS framework for PAD with a panel state list, according to an embodiment.

FIG. 7 is a diagram illustrating an example of an enhanced CSI-RS framework for PAD operation 700. In addition to CSI-ReportConfig 710, CSI-ResourceConfig 720 and one or more lists of trigger states 730, the framework 700 may further comprise a panel state list 740. The panel state list 740 may comprise CSI-PanelListConfig. In some embodiments, a WTRU may determine the CSI-RS configuration for each panel through the linkage provided in CSI-PanelListConfig. Therefore, a WTRU may use the same CSI-RS configuration setting for more than one panel or use independent report and resource settings per panel. In other embodiments, CSI-PanelListConfig may primarily contain panel ID information of activated panels that may be required to be configured according to a CSI-ReportConfig 710. Alternatively, it may contain panel ID information of all panels along with their state of activation, (e.g., deactivated, activated, hot). Therefore, a WTRU may maintain CSI-RS configuration for all panels and determine CSI-RS configuration of each panel upon a change in its state of activation.

Panel ID may be required as part of panel activation/deactivation procedures. A panel ID, an antenna group ID, or an antenna port group ID are used interchangeably when discussing PAD. Generally, it may be defined as a unit identified by such ID has an independent control on transmission beam, power, and timing.

Figure 8:
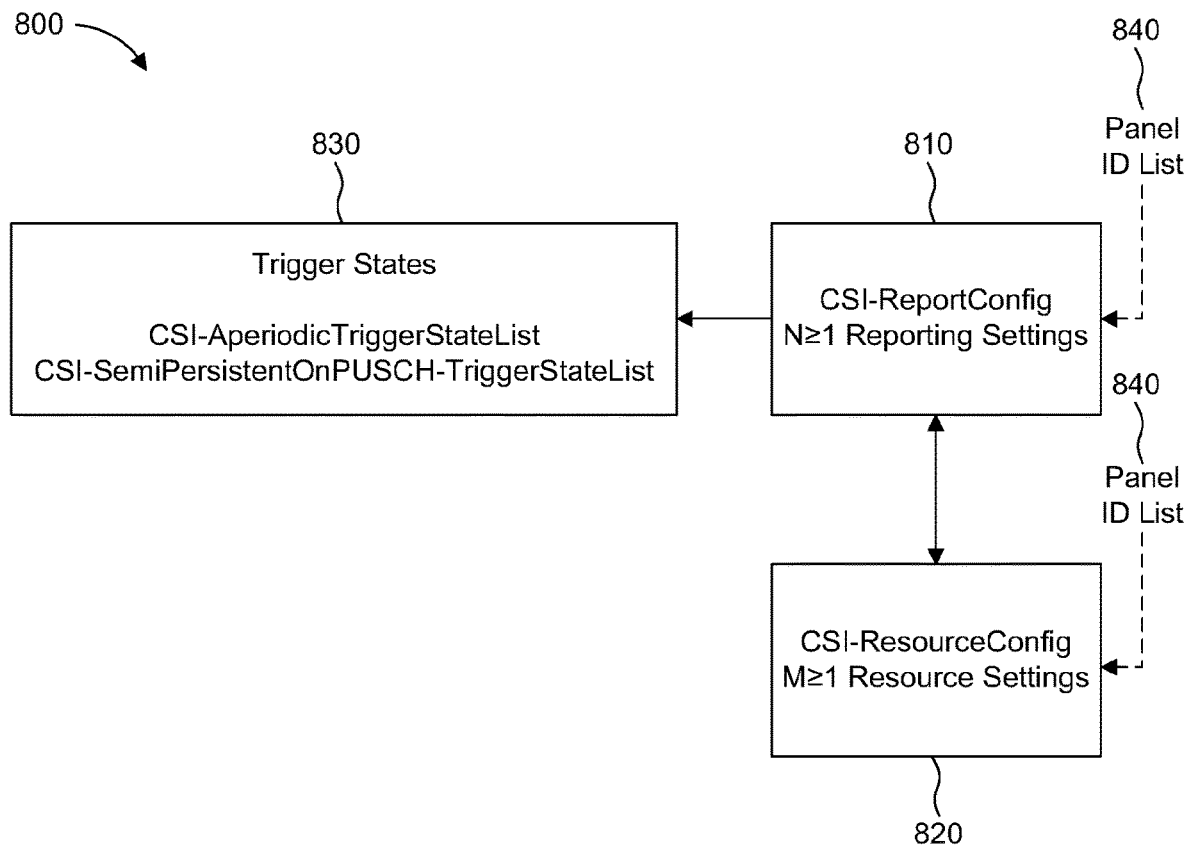
FIG. 8 is a diagram illustrating an example CSI-RS framework for PAD with enhanced report and resource setting, according to an embodiment.

FIG. 8 is a diagram illustrating an example of an enhanced CSI-RS framework for PAD operation 800. The framework 800 may comprise CSI-ReportConfig 810, CSI-ResourceConfig 820 and one or more lists of trigger states 830. In some embodiments, an index Panel ID 840 may be introduced as part of CSI-ReportConfig 810 and/or CSI-ResourceConfig 820 configurations.

In some embodiments, a Panel ID parameter 840 may be introduced only in CSI-ResourceConfig 820 configuration. Therefore, different CSI Resource settings may be assigned per panel. A WTRU may determine the CSI-RS configuration for each panel through the linkage provided in CSI-ResourceConfig 820. A WTRU may use the same CSI-RS configuration Report Setting for more than one panel or use independent Report and Resource Settings per panel. In some embodiments, the number of settings in CSI-ResourceCon FIG. 820 may need to be increased to M'>M to maintain flexibility.

In some embodiments, a Panel ID parameter 840 may be introduced only in CSI-ReportConfig 810 configuration. Therefore, different CSI Report Settings may be assigned per panel. A WTRU may determine the CSI-RS configuration for each panel through each setting per panel provided in CSI-ReportConfig 810. A WTRU may use the same CSI-RS configuration Resource setting for more than one panel or use independent Report and Resource Settings per panel. In some embodiments, the number of settings in CSI-ReportConfig 810 may need to be increased to N'>N to maintain flexibility.

In some embodiments, a Panel ID parameter 840 may be introduced in both CSI-ReportConfig 810 and CSI-ResourceConfig 820 configurations. Therefore, different CSI Report and Resource Settings may be assigned per panel. A WTRU may determine the CSI-RS configuration for each panel through each setting per panel provided in CSI-ReportConfig 810. A WTRU may use the same CSI-RS configuration Report and/or Resource settings for more than one panel or use independent Report and Resource Settings per panel. In some embodiments, the number of settings in CSI-ReportConfig 810 and CSI-ResourceConfig 820 may need to be increased to N'>N and M'>M, respectively to maintain flexibility.

In some embodiments, instead of inclusion of a Panel ID parameter 820 as part of CSI-ReportConfig 810 and/or CSI-ResourceConfig 820 configurations, the configuration objective CSI-PanelListConfig may be used. By coupling the CSI-PanelListCon fig objects to CSI-ReportConfig 810 and/or CSI-ResourceCon FIG. 840 configuration objects, at least one of CSI-RS configuration Report or Resource settings may be directly linked to the state of each panel.

Figure 9:
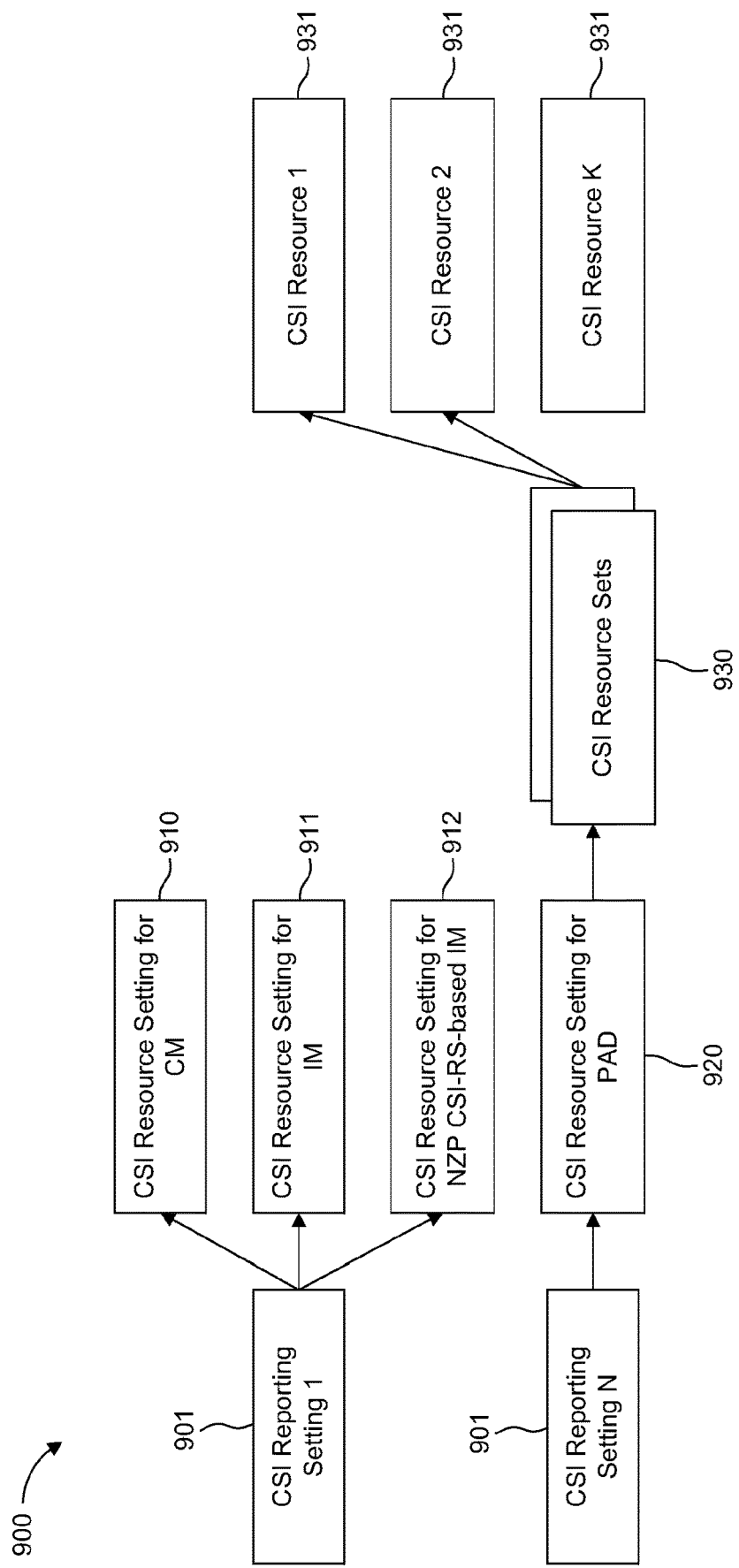
FIG. 9 is a diagram illustrating an example of CSI-RS framework for PAD, according to an embodiment.

In some embodiments, a panel ID may not be used. FIG. 9 is a diagram illustrating an example CSI-RS framework for PAD 900. The framework 900 may comprise a plurality of CSI reporting settings 901, where CSI resource settings are defined. A WTRU may be configured with a CSI resource setting for CM, 910, a CSI resource setting for IM 911, and a CSI resource setting for NZP CSI-RS based IM 912. The WTRU may be further configured with an additional CSI resource setting 920 comprising one or more CSI resource sets 930, each CSI resource set 930 comprising a plurality of CSI resources 931 for WTRU panel measurements. The WTRU carries out the measurements by an association of the report configuration with one or more CSI resource sets 930.

In some embodiments, the association may be indicated explicitly by the use of a panel ID in the CSI configuration to indicate which resources are to be monitored by what panel. This indication may be made in one of the following: the CSI resource set configuration, where each NZP-CSI-RS resource set, CSI-IM resource set and/or CSI-SSB Resource set may be configured with a panel ID corresponding to the panel on which measurements should be carried out; the CSI-resource configuration where the panel ID of each resource may be indicated; the CSI trigger state list that associates a report configuration with a resource set and a given panel ID; and/or, the CSI reporting configuration, where the panel ID may be indicated along with the UL PUCCH or PUSCH resources for CSI feedback, and where the WTRU may determine which panel ID to use for CSI evaluation based on the panel ID of the reporting configuration.

In some embodiments, an association may either be indicated explicitly by means of the panel ID within the configuration of the resources/reporting as presented above, or the association may be made by means of an association of the time instances in which the CSI-RS is transmitted. In some embodiments, the time domain property of CSI-RS transmission for PAD may be associated to the panel that the WTRU may use for CSI evaluation. In addition, for periodic CSI-RS transmission occurring every Nth slot (e.g., N ranging from 4 to 640), the WTRU may cycle among the different panels to evaluate the CSI. For example, the WTRU may consider that the first Nth slot is evaluated by panel 1, the second Nth slot is evaluated to panel 2, and so forth.

In some embodiments, the frequency domain property of the CSI-RS transmission for PAD may be associated with the panel the WTRU uses for CSI evaluation. For example, when the WTRU is configured with density one CSI-RS transmission (i.e., the CSI-RS transmission occurs at every RB), and where the WTRU has 4 activated panels, the WTRU may apply a density of ¼ for each of the configured panels.

In some embodiments, PAD may be based on measurement reporting events. In one embodiment, the PAD event may be a Layer 1 measurement reporting event. As disclosed herein, the WTRU may be configured with a set of DL resources of measurement time instances associated to different panels. A WTRU may be configured to measure resources but only report it at the event of some criteria. For example, the WTRU may be configured to measure CSI resources to be measured in different panels, while the configured periodic/aperiodic/semi-persistent reporting behavior remains for the activated panel. The WTRU may only trigger a report when a set of conditions are satisfied on the deactivated panel or both the activated and deactivated panels.

Furthermore, in some embodiments a device may need to carry out measurements without any corresponding reporting to the network (e.g., measurements for receiver-side downlink beamforming). These measurements may also be used to trigger measurement reporting.

One or more conditions triggering such an event may include, but are not limited to: CSI quantity (e.g., L1-RSRP, CQI) of a CSI resource in the deactivated panel is a threshold higher than the L1-RSRP of a CSI resource in the activated panel; CSI quantity of CSI resource in the activated panel is a lower than a threshold while the CSI quantity of the same CSI resource in the deactivated panel is higher than a threshold; and/or, CSI quantity of a CSI resource in the deactivated panel is better than a threshold.

In some embodiments, PAD is based on Layer 3 measurement reporting events. The WTRU may be configured by RRC with a set of new measurement reporting events for multi-panel aware mobility. These measurements may be based on one or multiple quantities SINR, RSRP, RSRQ and filtered over a longer period compared to layer 1 measurements.

Additional measurements events in the serving cell may be introduced for panel activation and/or deactivation. The measurement triggering events described above may be used for this purpose.

The WTRU may be configured to measure beams and derive cell quality of neighboring cells for mobility purpose from different panels. This may allow the WTRU to activate the best panel at the event of handover.

Additionally, measurement events for mobility purposes may also be performed and the measurements results for multi-panel may be piggybacked in an RRC measurement report.

There may be one or more such measurement events, including, but not limited to: the cell quality of a neighboring cell from panel x is a threshold better than the cell quality of the serving cell measured from panel y; the averaged cell quality measured over the N best panels in the neighboring cell is a threshold better than the averaged cell quality measured in the serving cell over the N best panels; the measurement report may contain the identity of N best beams measured at each panel, its measured quality (e.g., SINR, RSRP, RSRQ); and the measurement report may contain the identity of the best panel in which the WTRU has measured the highest quantity for the configured beams.

In some embodiments, there may be QCL determination for CSI-RS configuration. The transmission configuration indication (TCI) state may include at least one downlink reference signal (e.g., SS/PBCH block, CSI-RS, etc.) and its associated QCL type (e.g., QCL type A, B, C, D). In a multi-panel WTRU, since panels may be placed with different angular direction, one or more TCI states may be configured or used.

In some embodiments, a WTRU with M activated panels may be configured with one or more TCI states where each TCI state may be linked to one or more subsets of panels. In some embodiments, if a WTRU is configured with a CSI-RS measurement, the WTRU may determine a QCL for each CSI-RS setting according to the configured TCI state for the panel.

In some embodiments, TCI states may be grouped and indexed according to the Panel ID. A WTRU may determine the configured TCI state for each panel according to Panel ID.

In embodiments with more than one hot panels, a WTRU may be configured with one or more TCI states where each TCI state may be linked to one or more subsets of panels. In embodiments where a WTRU is configured with a CSI-RS measurement, the WTRU may determine QCL for each CSI-RS setting according to the configured TCI state for the panel.

Figure 10:
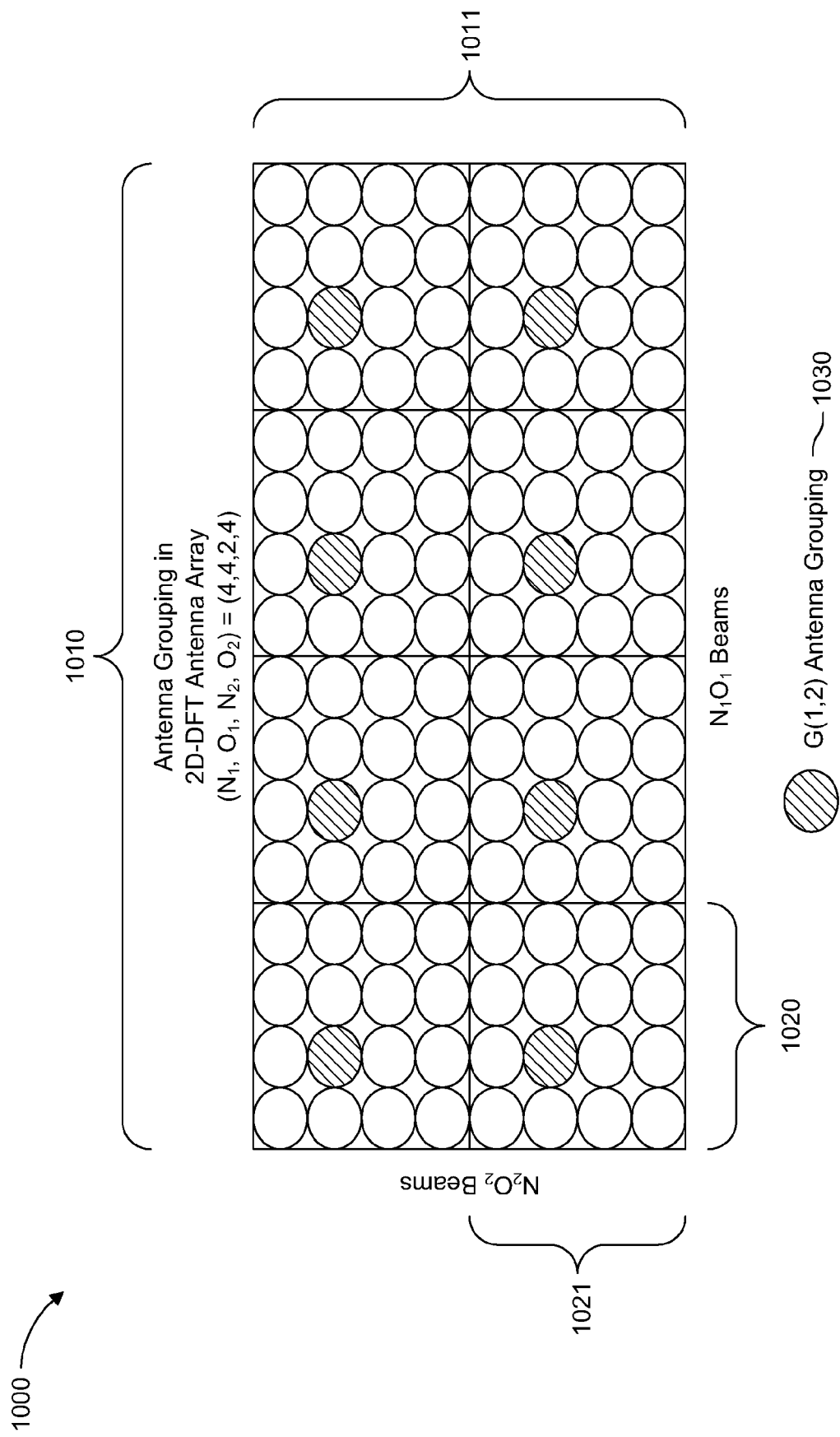
FIG. 10 is a diagram illustrating an example 2D rectangular antenna array modeled by discrete Fourier transform (DFT) vectors, according to an embodiment.

FIG. 10 is a diagram of an example 2D rectangular antenna array modeled by DFT vectors 1000.

2D-DFT Precoding Codebook Database is derived as the Kronecker Product (KP) of two DFT vectors, which is proved to be the optimal projection of principle eigenvector in a 3D channel. In 3D beamforming MU-MIMO, a 2D co-polarized uniform rectangular antenna array may be used. In order to add more granularity to the beamforming rotation, a spatial oversampling ratio may be introduced in each dimension, denoted as $(O_1, O_2)$.

Codebook subset restriction (CBSR) may suppress interference of adjacent cells by imposing restriction on strength of some spatial beams. As a result, some beams may be completely shut down or, at least their power may be reduced to mitigate or reduce potential impact on reception.

FIG. 10 shows an example implementation for an antenna array of size $(N_1, N_2)=(4,2)$ 1010, 111 and $(O_1, O_2)=(4,4)$ 1020,1021. In some embodiments, CBSR may be supported to mitigate the inter-cell interference, where Type II CBSR is imposed on up to four antenna groups 1030 of size $N_1N_2$, through restricting their WB and subsequently SB amplitudes. Type II CBSR may comprise a codebook used for codebook subset restriction to restrict power per beam. In some embodiments, the maximum allowed amplitude coefficients for the restricted beams is selected from $$\left\{0, \frac{1}{2}, \frac{1}{\sqrt{2}}, 1\right\}.$$

In some embodiments, the WB amplitude per beam may not be reported. Moreover, the reported coefficients may be a transform of the subband information and do not directly represent them. Therefore, applying the amplitude restriction on the reported coefficients may not achieve the desired CBSR. Therefore, a CBSR that requires a least amount of chance in calculate CSI feedback while being consistent with the baseline is desirable.

In a first embodiment, the precoding codebook may be defined as Equation 1.

$$W=W_1W_2 \qquad \text{Eq. 1}$$

In Equation 1, $W_1$ defines the WB spatial beams and $W_2$ defines the linear combination coefficients.

In a second embodiment, the precoding codebook may be defined as Equation 2.

$$W=W_1\tilde{W}_2W_f^H, \qquad \text{Eq. 2}$$

In Equation 2, $W_f$ is the FD-compression matrix and $\tilde{W}_2$ is the matrix of compressed coefficients.

CBSR in the first embodiment may be straightforward, as the coefficients are exactly reported as they are in $W_2$. In the second embodiment, the compressed and transformed version of the coefficients may be reported by $\tilde{W}_2$.

In some embodiments, a WTRU may compute the restriction coefficients in parallel to the $\tilde{W}_2$ in one or more steps. The restriction threshold may be calculated based on the CBSR maximum allowed WB amplitude for restricted beam (l*): $T_{l^*}$. In the restricted beam l*, for each subband the amplitude may be calculated by Equation 3.

$$|W_2(l^*,n)|, n \in \{1,N_3\} \qquad \text{Eq. 3}$$

If the amplitude is higher than the threshold, then the overloading ratio is calculated by Equation 4.

$$d_{l^*,n} = \frac{|W_2(l^*, n)| - T_{l^*}}{|W_2(l^*, n)|} \qquad \text{Eq. 4}$$

The ducking vector, Equation 5, may be calculated for all subbands, whose task is to restrict the SB amplitudes to the threshold's limit.

$$u(l^*, n) = \begin{cases} 0 & |w_2(l^*, n)| \le T_{l^*} \\ d_{l^*,n} \times w_2(l^*, n) & |w_2(l^*, n)| > T_{l^*} \end{cases} \qquad \text{Eq. 5}$$

The ducking vector may then be compressed the same way as $W_2$ was compressed using the $W_f$, resulting in $\tilde{U}$. The coefficients of the restricted beam are then calculated by subtracting the restricting coefficients from the $\tilde{W}_2$, as shown in Equation 6.

$$\tilde{W}_{2CBSR}(l^*) = \tilde{W}_2(l^*) - \tilde{U}(l^*) \qquad \text{Eq. 6}$$

Finally, the WTRU may report $\tilde{W}_{2CBSR}$ that includes the coefficients of the restricted beam.

FIGS. 11A, 11B, 11C, and 11D are charts 1101, 1102, 1103 and 1104 demonstrating performance evaluations) of the embodiments disclosed herein, ID-Ducking 1120, in comparison with a baseline 1110 and an Alt2 scheme 1130. Specifically, charts 1101, 1102, 1103, and 1104 illustrate the Probability Mass Function (PMF) of the DFT-transform coefficients. Four 2-polarized beams may be assumed where Equation 7 is satisfied.

$$N_{SB}=13, N_3=R \times N_{SB}, R \in \{1,2\}, p=\tfrac{1}{4}, \text{ and } \beta=\tfrac{1}{4}. \qquad \text{Eq. 7}$$

The number of FD subset selection per layer may be described using Equation 8.

$$M = \left\lceil p \times \frac{N_3}{R} \right\rceil = 4 \qquad \text{Eq. 8}$$

The two first and the two last frequency indices may be considered to be reported. As for the CBSR, different restrictions of $$\left\{\frac{1}{2}, \frac{1}{\sqrt{2}}\right\}$$

are considered. For example, in the charts 1100 (FIG. 11A) and 1103 (FIG. 11C), a CBSR of is considered and in charts 1102 (FIG. 11B) and 1104 (FIG. 11D), a CBSR of $$\frac{1}{\sqrt{2}}$$

is considered.

In charts 1101 and 1102, a rate to increase the CSI feedback granularity in frequency domain (R) of 1 is considered. In charts 1103 and 1104, a rate to increase the CSI feedback granularity in frequency domain (R) of 2 is considered.

The relative difference of each scheme compared to the baseline 1110 is also provided. The relative difference of each scheme compared to the baseline 1110 may be calculated using Equation 9 for the reported subbands.

$$\sum \frac{|x - x_{base-line}|}{x_{base-line}} \qquad \text{Eq. 9}$$

Figure 11A:
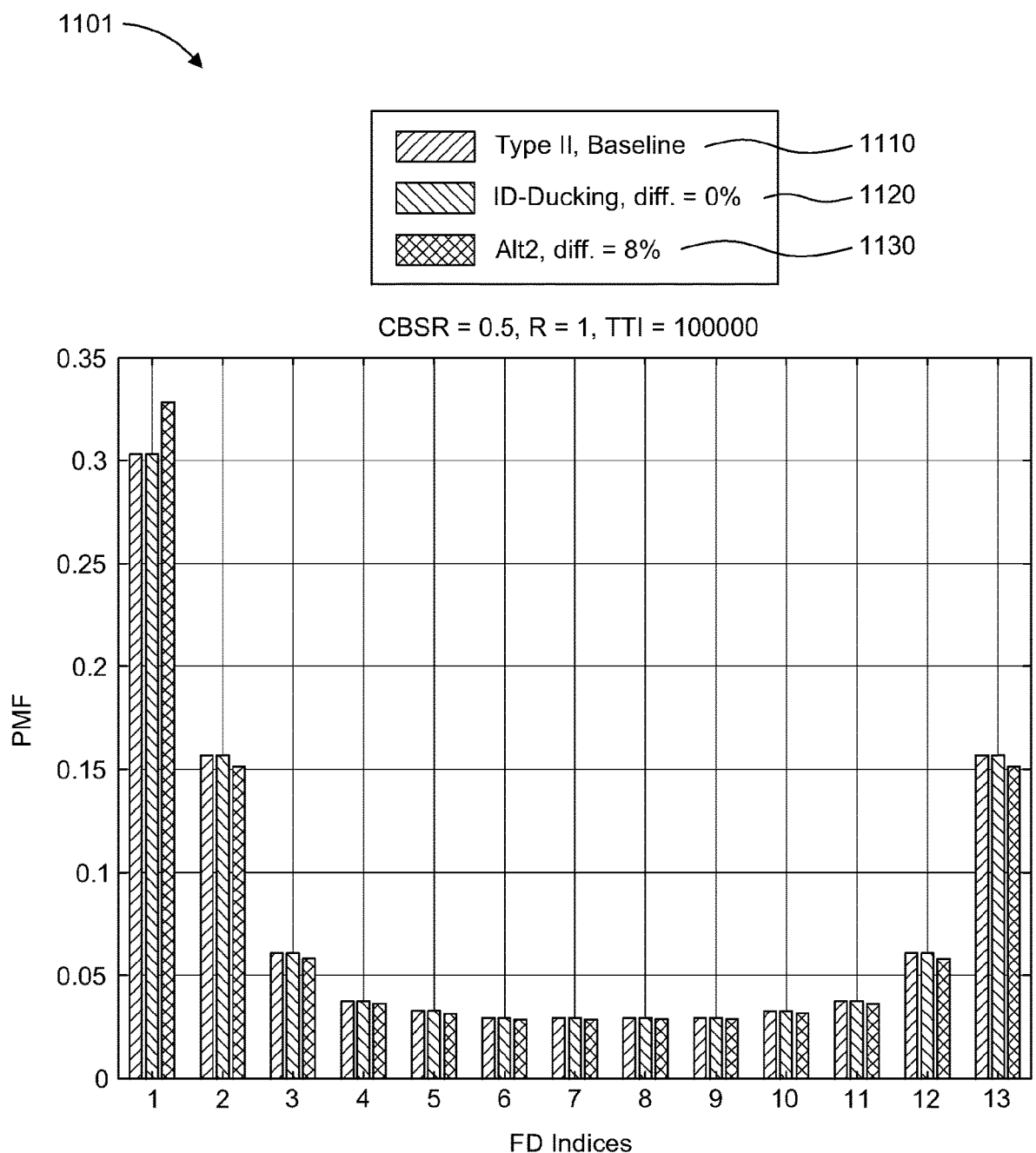
FIGS. 11A, 11B, 11C, and 11D are a collection of charts demonstrating a performance comparison of codebook subset restriction (CBSR) according to one or more embodiments disclosed herein.
Figure 11B:
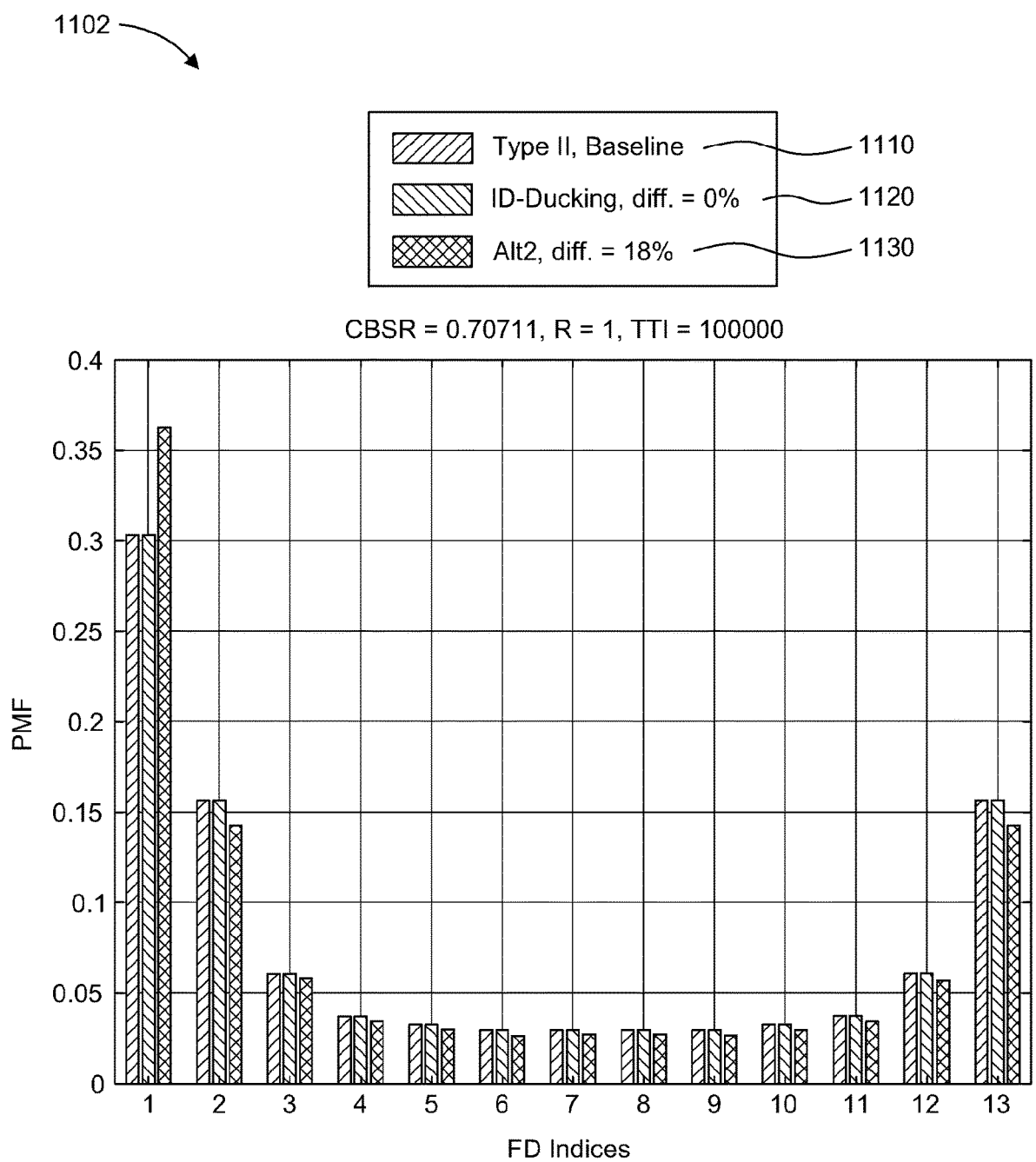
Figure 11C:
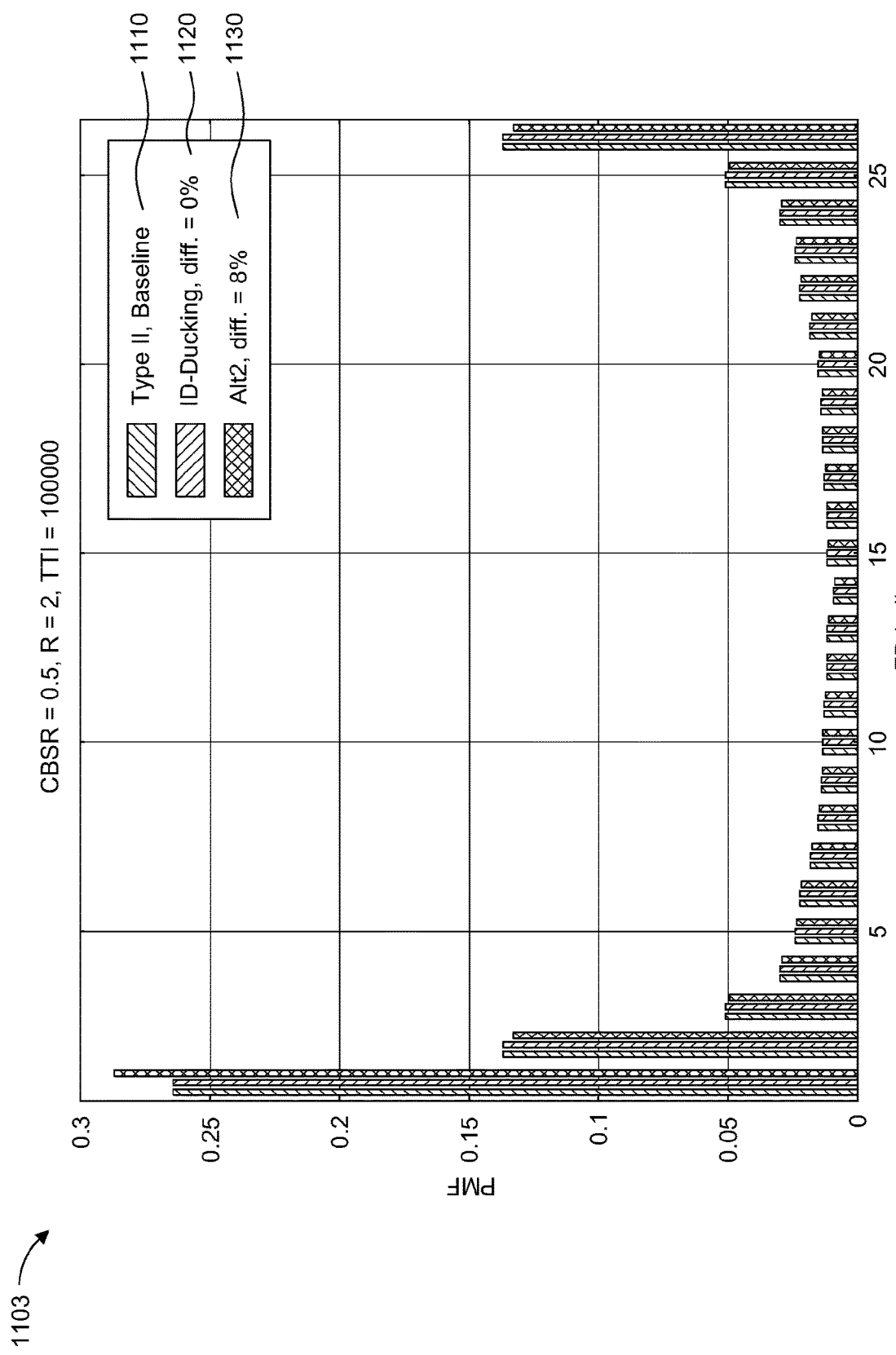
Figure 11D:
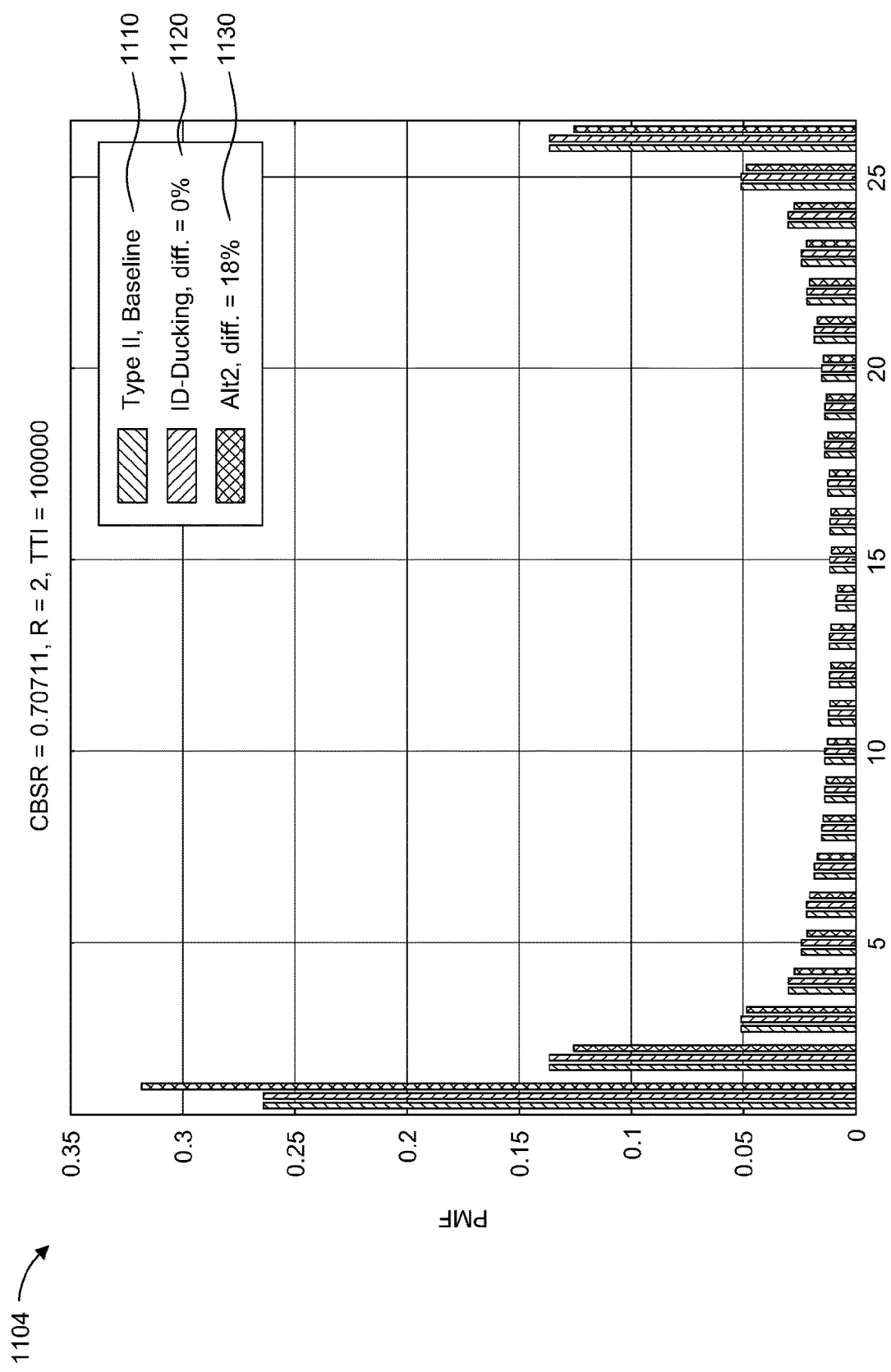

It may be seen that the embodiments disclosed herein are in compliance with the baseline 1110, with a relative difference equal to zero. In contrary, the Alt2 scheme 1130 may cause a severe discrepancy on the reported coefficients compared to the baseline 1110. In average and compared to the baseline 1110, for CBSR limits equal to ½, the Alt2 scheme 1130 may impose an 8% relative difference on the reported coefficients, as shown in chart 1101 (FIG. 11A) and chart 1103 (FIG. 11C). In average and compared to a baseline 1110, for CBSR limits equal to $$\frac{1}{\sqrt{2}},$$

the Alt2 scheme 1130 may impose an 18% relative difference on the reported coefficients, as shown in chart 1102 (FIG. 11B) and chart 1104 (FIG. 11D).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a wireless transmit/receive unit (WTRU), the method comprising:
   receiving information related to a channel state information reference signal (CSI-RS) configuration for first panels and second panels;
   measuring a CSI-RS using one or more panels of the first panels; and
   in response to a triggering event:
      sending a request to a base station to transmit a CSI-RS associated with one or more panels of the second panels;
      activating the one or more panels of the second panels;
      measuring the CSI-RS associated with the one or more panels of the second panels; and
      identifying a panel having a CSI-RS measurement greater than a threshold and reporting the identified panel to the base station.

2. The method of claim 1, wherein the triggering event corresponds to a channel quality indicator (CQI) of one or more panels of the first panels measured below a threshold.

3. The method of claim 1, wherein the triggering event corresponds to a reference signal received power (RSRP) of one or more panels of the first panels measured below a threshold.

4. The method of claim 1, wherein the triggering event corresponds to a signal to interference plus noise ratio (SINR) of one or more panels of the first panels measured below a threshold.

5. The method of claim 1, wherein the first panels are activated panels.

6. The method of claim 1, wherein the second panels are deactivated panels at least prior to the activating.

7. The method of claim 1, wherein the method is for determining whether to activate or deactivate a panel.

8. The method of claim 1, wherein the triggering event is receipt of downlink control information (DCI), wherein the base station is a next generation node b (gNB).

9. The method of claim 1, wherein the information related to the CSI-RS configuration includes one or more of: a CSI report configuration (CSI-ReportConfig), a CSI resource configuration (CSI-ResourceConfig) or a trigger state list.

10. The method of claim 1, wherein at least some of the first panels and the second panels are associated with one another and each of the first panels and the second panels identified by the WTRU by panel identifiers (panel IDs).

11. A wireless transmit/receive unit (WTRU) comprising:
a transceiver configured to receive information related to a channel state information reference signal (CSI-RS) configuration for first panels and second panels;
circuitry configured to measure a CSI-RS using one or more panels of the first panels; and
in response to a trigger event:
the transceiver configured to transmit a request to a base station to transmit a CSI-RS associated with one or more panels of the second panels;
circuitry configured to activate the one or more panels of the second panels;
circuitry configured to measure the CSI-RS associated with the one or more panels of the second panels;
circuitry configured to identify a panel having a CSI-RS measurement greater than a threshold; and
the transceiver configured to transmit a report indicating the identified panel to the base station.

12. The WTRU of claim 11, wherein the trigger event corresponds to a channel quality indicator (CQI) of one or more panels of the first panels measured below a threshold.

13. The WTRU of claim 11, wherein the trigger event corresponds to a reference signal received power (RSRP) of one or more panels of the first panels measured below a threshold.

14. The WTRU of claim 11, wherein the trigger event corresponds to a signal to interference plus noise ratio (SINR) of one or more panels of the first panels measured below a threshold.

15. The WTRU of claim 11, wherein the first panels are activated panels.

16. The WTRU of claim 11, wherein the second panels are deactivated panels at least prior to the activation.

17. The WTRU of claim 11, wherein the WTRU is configured to determine whether to activate or deactivate a panel.

18. The WTRU of claim 11, wherein the trigger event is receipt of downlink control information (DCI), wherein the base station is a next generation node b (gNB).

19. The WTRU of claim 11, wherein the information related to the CSI-RS configuration includes one or more of: a CSI report configuration (CSI-ReportConfig), a CSI resource configuration (CSI-ResourceConfig) or a trigger state list.

20. The WTRU of claim 11, wherein at least some of the first panels and the second panels are associated with one another and each of the first panels and the second panels identified by the WTRU by panel identifiers (panel IDs).

* * * * *